(12) United States Patent
Basu Mallick et al.

(10) Patent No.: US 10,375,737 B2
(45) Date of Patent: Aug. 6, 2019

(54) METHOD AND APPARATUS FOR SENDING AND RECEIVING INFORMATION ON A WIRELESS NETWORK

(71) Applicant: Motorola Mobility LLC, Chicago, IL (US)

(72) Inventors: Prateek Basu Mallick, Langen (DE); Joachim Lohr, Wiesbaden (DE); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/613,203

(22) Filed: Jun. 3, 2017

(65) Prior Publication Data
US 2018/0324862 A1 Nov. 8, 2018

Related U.S. Application Data

(60) Provisional application No. 62/502,220, filed on May 5, 2017.

(51) Int. Cl.
| | |
|---|---|
| *H04W 74/08* | (2009.01) |
| *H04W 76/27* | (2018.01) |
| *H04W 72/04* | (2009.01) |
| *H04W 72/14* | (2009.01) |
| *H04W 76/10* | (2018.01) |
| *H04W 48/10* | (2009.01) |
| *H04W 72/06* | (2009.01) |

(Continued)

(52) U.S. Cl.
CPC ....... *H04W 74/0833* (2013.01); *H04W 48/10* (2013.01); *H04W 72/0413* (2013.01); *H04W 72/06* (2013.01); *H04W 72/12* (2013.01); *H04W 72/14* (2013.01); *H04W 74/0866* (2013.01); *H04W 76/10* (2018.02); *H04W 76/27* (2018.02); *H04W 74/008* (2013.01); *H04W 84/02* (2013.01); *H04W 88/02* (2013.01); *H04W 88/08* (2013.01)

(58) Field of Classification Search
CPC ......... H04W 74/0833; H04W 74/0866; H04W 76/10
See application file for complete search history.

(56) References Cited

U.S. PATENT DOCUMENTS 9,867,216 B2 * 1/2018 Lee ................... H04W 74/085
2009/0259910 A1 10/2009 Lee et al.
(Continued)

FOREIGN PATENT DOCUMENTS

WO 2015137632 A1 9/2015

OTHER PUBLICATIONS

Rose, Notice of References Cited, U.S. Appl. No. 15/613,202, U.S. Patent and Trademark Office, dated Aug. 28, 2018.
(Continued)

*Primary Examiner* — Benjamin H Elliott, IV
(74) *Attorney, Agent, or Firm* — Loppnow & Chapa; Matthew C. Loppnow

(57) ABSTRACT

A method and apparatus send and receive information on a wireless network. A user equipment can establish a radio resource control connection with a wireless wide area network base station to enter a radio resource control connected state. The user equipment can send a medium access control control element requesting system information while in the radio resource control connected state.

18 Claims, 7 Drawing Sheets

(51) Int. Cl.
*H04W 72/12* (2009.01)
*H04W 88/02* (2009.01)
*H04W 88/08* (2009.01)
*H04W 84/02* (2009.01)
*H04W 74/00* (2009.01)

(56) References Cited

U.S. PATENT DOCUMENTS

| | | | |
|---|---|---|---|
| 2010/0330995 A1 | 12/2010 | Aoyama et al. | |
| 2012/0044880 A1 | 2/2012 | Sun et al. | |
| 2013/0329715 A1 | 12/2013 | Li et al. | |
| 2015/0245347 A1* | 8/2015 | Yi | H04L 5/001 |
| | | | 370/280 |
| 2016/0065350 A1* | 3/2016 | Suzuki | H04W 28/18 |
| | | | 370/329 |
| 2016/0330011 A1* | 11/2016 | Lee | H04L 5/0066 |
| 2017/0353819 A1 | 12/2017 | Yin et al. | |
| 2018/0035359 A1* | 2/2018 | Ishii | H04W 48/10 |
| 2018/0139770 A1 | 5/2018 | Ozturk et al. | |
| 2018/0192255 A1* | 7/2018 | Guo | H04L 12/189 |
| 2018/0220465 A1* | 8/2018 | Zhang | H04L 1/00 |
| 2018/0255586 A1* | 9/2018 | Einhaus | H04L 5/00 |
| 2018/0270682 A1* | 9/2018 | Zacharias | H04W 76/10 |
| 2018/0279377 A1* | 9/2018 | Lin | H04L 5/0055 |
| 2018/0324862 A1* | 11/2018 | Mallick | H04W 76/27 |

OTHER PUBLICATIONS

Lopez, PCT International Application Search Report, International Application No. PCT/US2018/030036, European Patent Office, Rijswijk, NL, dated Jul. 16, 2018.

CATT: "On-demand system information delivery mechanism", 3GPP Draft; R2-166120, 3rd Generation Partnership Project (3GPP), Mobile Competence Centre ; 650, Route Des Lucioles ; F-06921 Sophia-Antipolis Cedex ; France ; vol. RAN WG2, No. Kaohsiung; Oct. 10, 2016-Oct. 14, 2016, Oct. 9, 2016.

Mediatek Inc: "NR SI Unicast", 3GPP Draft; R2-1701362 NR SI Unicast, 3rd Generation Partnership Project (3GPP), Mobile Competence Centre; 650, Route Des Lucioles ; F-06921 Sophia-Antipolis Cedex ; France ; vol. RAN WG2, No. Athens, Greece; Feb. 13, 2017-Feb. 17, 2017, Feb. 12, 2017.

Rose, Notice of References Cited, U.S. Appl. No. 15/613,199, U.S. Patent and Trademark Office, dated Oct. 26, 2018.

* cited by examiner

METHOD AND APPARATUS FOR SENDING AND RECEIVING INFORMATION ON A WIRELESS NETWORK

CROSS-REFERENCE TO RELATED APPLICATIONS

This application is related to an application entitled "Method and Apparatus for Sending and Receiving Information on a Wireless Network," U.S. application Ser. No. 15/613,199 and an application entitled "Method and Apparatus for Sending and Receiving Information on a Wireless Network," U.S. application Ser. No. 15/613,202, filed on even date herewith and commonly assigned to the assignee of the present application, which are hereby incorporated by reference.

BACKGROUND

1. Field

The present disclosure is directed to a method and apparatus for sending and receiving information on a wireless network. In particular, the present disclosure is directed to prioritizing system information requests, short latency application data, and other data and control information on a wireless wide area network.

2. Introduction

Presently, portable wireless communication devices, such as User Equipment (UE), communicate with other communication devices using wireless signals over a wireless network. A UE uses System Information (SI) to access the wireless network. In order to reduce the signaling load for the provisioning of SI, the concept of "minimum SI" has been introduced for New Radio (NR), such as for 5th Generation (5G) networks. The minimum SI, which contains basic information for initial access to the cell, such as System Frame Number (SFN), list of Public Land Mobile Networks (PLMNs), cell camping parameters, Random Access Channel (RACH) parameters, are always broadcast periodically in a cell, whereas the other non-minimum SI do not necessarily need to be periodically broadcast. For example, it is a network decision when and if to broadcast the other SI. The other SI can be provided on-demand to the User Equipments (UEs). For example, a UE can request the other SI. Delivery of other SI can be done by broadcast or unicast manner.

The minimum SI indicates whether a specific System Information Block (SIB) is periodically broadcasted or provided on-demand. In order to obtain the one or more SIBs, which are not periodically broadcasted and are provided on-demand, a UE initiates the on-demand SI acquisition procedure. For an SI required by the UE, the UE should know whether it is available in the cell and whether it is broadcast or not before it sends the other SI request. For example, the UE shall first acquire the minimum SI. The scheduling information for the other SI, which is provided by the minimum SI, such as in SIB1, should include SIB type, validity information, periodicity, and SI-window information. A UE in idle and inactive state can request the other SI without state transition using the RACH procedure message MSG1 and/or MSG3-based approach. For UEs in a connected state, such as a RRC connected state, dedicated Radio Resource Control (RRC) signaling can be used for the request and delivery of the other SI.

Unfortunately, SI requests, Ultra-Reliable and Low-Latency Communications (URLLC) data, and other time-sensitive data are sometimes delayed because other information, such as a Buffer Status Report (BRS) or a Medium Access Control (MAC) Control Element (CE), is transmitted in an uplink grant instead of the time-sensitive data requested for the grant.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
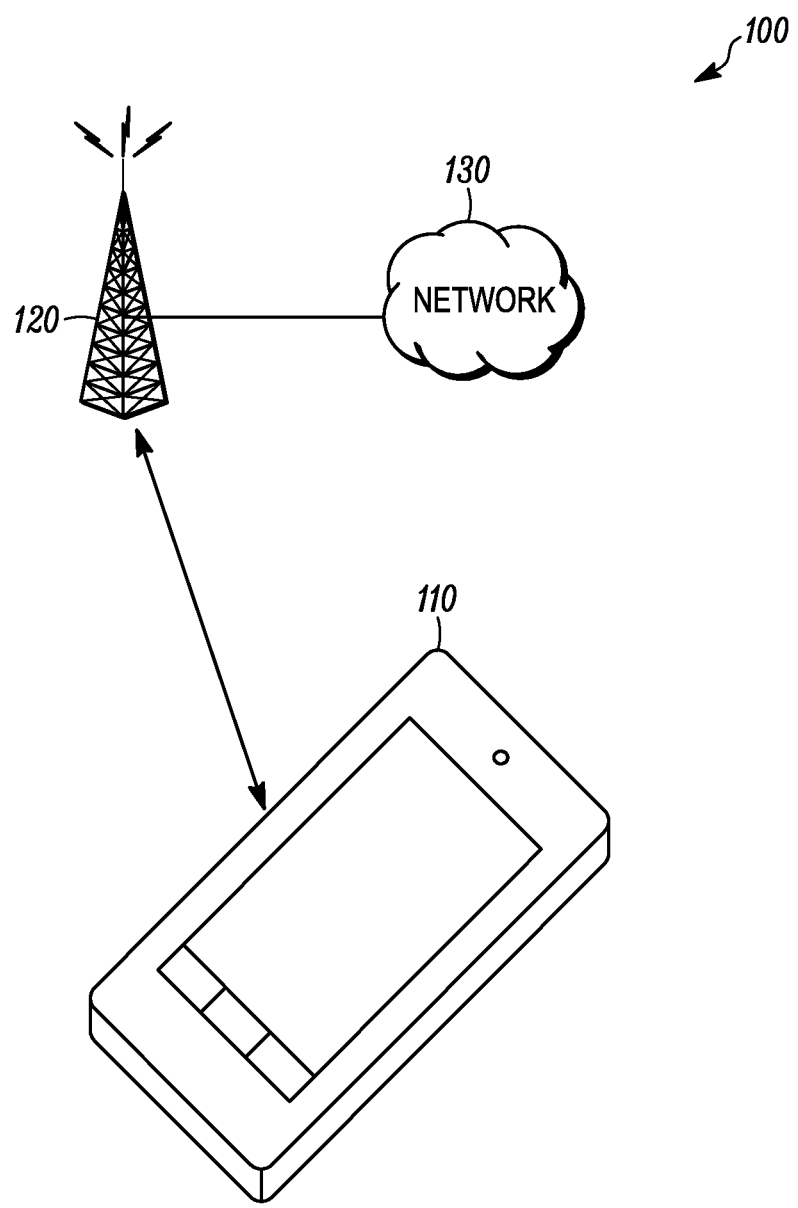
FIG. 1 is an example block diagram of a system according to a possible embodiment.

Embodiments provide a method and apparatus for sending and receiving information on a wireless network. According to a possible embodiment, a user equipment can establish a radio resource control connection with a wireless wide area network base station to enter a radio resource control connected state. The user equipment can send an uplink grant request message using a predefined dedicated random access channel preamble while in the radio resource control connected state. The user equipment can receive an uplink grant from the base station. The user equipment can transmit a radio resource control message in response to receiving the uplink grant.

According to another possible embodiment, a controller can control operations of an apparatus. A transceiver can be coupled to the controller. The transceiver can establish a radio resource control connection with a wireless wide area network base station to enter a radio resource control connected state. The transceiver can send an uplink grant request message using a predefined dedicated random access channel preamble while in the radio resource control connected state. The transceiver can receive an uplink grant from the base station. The transceiver can transmit a radio resource control message in response to receiving the uplink grant.

According to another possible embodiment, a wireless wide area network base station can establish a radio resource control connection with a user equipment. The wireless wide area network base station can receive an uplink grant request message having a predefined dedicated random access channel preamble while having the resource control connection with the user equipment. An uplink grant can be sent to the user equipment in response to receiving the uplink grant request message having a predefined dedicated random access channel preamble. A radio resource control message can be received corresponding to the uplink grant.

According to another possible embodiment, a controller can control operations of an apparatus. The controller can establish a radio resource control connection with a user equipment. A transceiver can be coupled to the controller. The transceiver can receive an uplink grant request message having a predefined dedicated random access channel preamble while having the resource control connection with the user equipment. The transceiver can send an uplink grant to the user equipment in response to receiving the uplink grant request message having a predefined dedicated random access channel preamble. The transceiver can receive a radio resource control message corresponding to the uplink grant.

According to another possible embodiment, a user equipment can establish a radio resource control connection with a wireless wide area network base station to enter a radio resource control connected state. The sending of a special priority bearer other than a medium access control control element can be prioritized over sending a medium access control control element used for power headroom reporting. The user equipment can send the special priority bearer while in the radio resource control connected state.

According to another possible embodiment, a controller can control operations of an apparatus. The controller can establish a radio resource control connection with a wireless wide area network base station to enter a radio resource control connected state. The controller can prioritize sending a special priority bearer other than a medium access control control element over sending a medium access control control element used for power headroom reporting. A transceiver can be coupled to the controller. The transceiver can send the special priority bearer while in the radio resource control connected state.

According to another possible embodiment, a special priority bearer other than a medium access control control element can be configured to take priority over a medium access control control element used for power headroom reporting. Information regarding the special priority bearer can be sent to a user equipment. A radio resource control connection can be established with the user equipment. The special priority bearer can be received while having the resource control connection with the user equipment.

According to another possible embodiment, a controller can control operations of an apparatus. The controller can configure a special priority bearer other than a medium access control control element to take priority over a medium access control control element used for power headroom reporting. A transceiver can be coupled to the controller. The transceiver can send information regarding the special priority bearer to a user equipment. The controller can establish a radio resource control connection with the user equipment. The transceiver can receive the special priority bearer while having the resource control connection with the user equipment.

According to another possible embodiment, a user equipment can establish a radio resource control connection with a wireless wide area network base station to enter a radio resource control connected state. The user equipment can send a medium access control control element requesting system information while in the radio resource control connected state.

According to another possible embodiment, a controller can control operations of the apparatus. The controller can establish a radio resource control connection with a wireless wide area network base station to enter a radio resource control connected state. A transceiver can be coupled to the controller. The transceiver can send a medium access control control element requesting system information while in the radio resource control connected state.

According to another possible embodiment, a wireless wide area network base station can establish a radio resource control connection with a user equipment. The wireless wide area network base station can receive a medium access control control element from the user equipment while the base station has a radio resource control connection established with the user equipment. The medium access control control element can request system information. The system information can be sent to the user equipment in response to receiving the medium access control control element.

According to another possible embodiment, a controller can control operations of the apparatus The controller can establish a radio resource control connection with a user equipment. A transceiver can be coupled to the controller. The transceiver can receive a medium access control control element from the user equipment while the base station has a radio resource control connection established with the user equipment. The medium access control control element can request system information. The transceiver can send the system information to the user equipment in response to receiving the medium access control control element.

FIG. 1 is an example block diagram of a system 100 according to a possible embodiment. The system 100 can include a User Equipment (UE) 110, a base station 120, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The base station 120 can be a wireless wide area network base station, a NodeB, an enhanced NodeB (eNB), a 5th Generation (5G) or New Radio NodeB (gNB), an unlicensed network base station, an access point, or any other base station that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In some embodiments, Radio Resource Control (RRC) connected User Equipments (UEs), such as the UE 110, can use dedicated messages to request specific System Information Blocks (SIBs) over the network 130 via the base station 120. To be able to send an Uplink (UL) dedicated message requesting certain SIB(s), the UE can require an UL grant. The UL grant can be requested using a Random Access Channel (RACH) procedure, where a base station in a network can provide an UL grant in msg2. However, a network may only provide a nominal grant that is just sufficient to transmit a Buffer Status Report (BSR). Further, since in Long Term Evolution (LTE) the priority for a RRC message, except an UL-Common Control Channel (UL-CCCH), is lower compared with all the Medium Access Control (MAC) Control Elements (CEs), except a padding BSR, a BSR report will be sent, but not the RRC message itself. For example, if the UL grant is not big enough to accommodate the RRC message fully, the BSR report can be sent, but not the RRC message itself. This can delay a System Information (SI) request and, in some cases, this delay can be detrimental, as it can delay the delivery of important SIB(s). These SIB(s) can be critical depending on the type of application. For example, SIBs can be critical for applications like vehicular communication applications, a public safety services application, and other applications that are sensitive to delays in receiving the SIBs. Some embodiments can provide for sending time-sensitive SIBs in a timelier manner.

In further embodiments, Ultra-Reliable and Low-Latency Communications (URLLC) data are small data packets with end to end latencies shorter than 1 ms. Based on the LTE logical channel prioritization procedure, URLLC data can be de-prioritized compared with many MAC CEs, such as described in section 5.4.3.1 of Technical Specification (TS) 36321-e10. In some cases, this can result in not meeting desired URLLC data latency, such as when the URLLC or similar short latency application data cannot be carried in the received grant because the MAC CEs have higher priority and are thus transmitted in the grant instead of the URLLC data. Some embodiments can provide for sending short latency application data in a timelier manner.

In New Radio (NR), such as 5G, there can be some SIBs that will be only provided on on-demand basis. For example, UEs may need to request these SIBs. A RRC idle mode UE can use RACH message 1 or message 3 to indicate which SIB(s) it needs. A RRC Connected mode UE can send a dedicated RRC message to request the required SIBs. To be able to send the UL dedicated RRC message requesting certain SIB(s), the UE can need an UL grant. The UL grant can be requested using RACH procedure, where the network can provide an UL grant in msg2. However, the network may only provide a nominal grant sufficient to transmit a BSR report. Further, since in LTE the priority for RRC message, except an UL-CCCH, can be lower compared with all the MAC CEs, except a padding BSR, a BSR report can be sent but not the RRC message itself, such as when the grant is not big enough to accommodate the RRC message fully. This can delay the SI request and in some cases, this delay might be detrimental as it might delay the delivery of important SIB. These SIB(s) might be critical depending on the type of application such as like vehicular communication applications, public safety services related applications, and other applications that require time sensitive communications. Some embodiments can provide for sending time sensitive data in a timelier manner.

Figure 2:
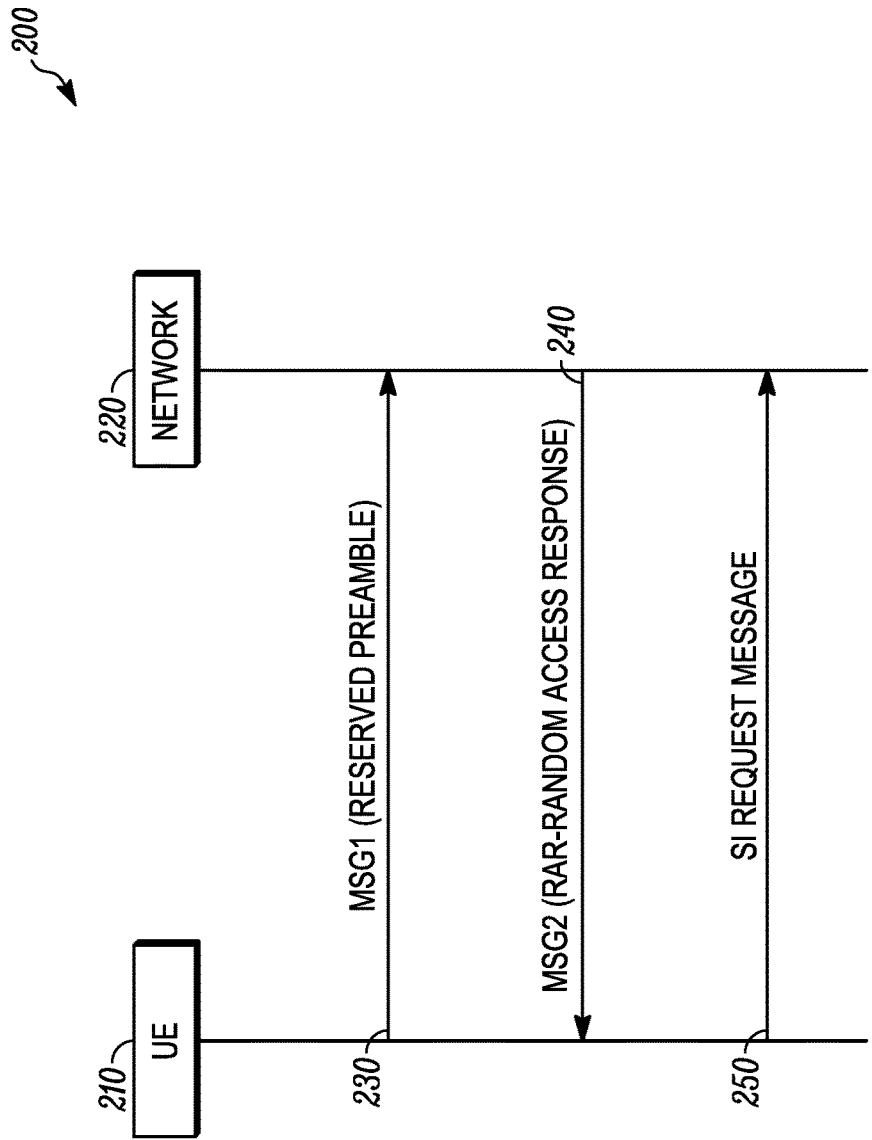
FIG. 2 is an example illustration of system using a reserved preamble to receive a grant to send a system information request according to a possible embodiment.

FIG. 2 is an example illustration of system 200 using a reserved preamble to receive a grant to send a SI request according to a possible embodiment. According to this embodiment, preamble(s) can be reserved for SI requests for UEs in RRC Connected state. For example, all RRC Connected UEs can share the reserved preamble(s) for SI request purposes. The reserved preamble(s) can be included in an essential SIB that can anyway be provided to the UE by the network. Also, the reserved preamble(s) can be sent to the UEs using a dedicated RRC message. In addition, a particular UE might be temporarily provided a dedicated preamble, which can be done in, for example, a handover command message so that after the handover the UE can request some specific SIBs from the target network.

When using the reserved preamble, the network can send a grant big enough to accommodate the SI-request for a preamble reserved for the SI request together with some MAC CE, such as a long BSR report. Also, when using the reserved preamble, if the grant is not as big, such as not large enough to include both the SI request and the MAC CE, then UE can prioritize the transmission of the SI request for a preamble reserved for the SI request or URLLC data. In this case, the network can provide a subsequent grant to the UE to send the BSR. According to possible implementations, these methods can also be used for any other important RRC messages, for special short latency data, and/or other such data.

According to an example embodiment in the system 200, at 230, a UE 210 can send a msg1 to a base station of the network 220. The msg1 can include the reserved preamble to request a grant for a SI request. At 240, the network 220 can send a Random Access Response (RAR) that grants resources to the UE for sending the SI request message. At 250, the UE can send the SI request message to request SI.

According to another possible embodiment, the priority for the Logical Channel Prioritization procedure can be altered such that the RRC message for requesting SIB(s) is higher in priority than some of the MAC CEs. For example, in order of priority with "1" being the highest priority:

1. MAC control element for Cell Radio Network Temporary Identifier (C-RNTI) or data from UL-CCCH;
2. UL-Dedicated Control Channel (DCCH) message requesting SI;
3. MAC control element for Semi-Persistent Scheduling (SPS) confirmation;
4. MAC control element for BSR, with exception of BSR included for padding;
5. MAC control element for PHR, Extended PHR, or Dual Connectivity PHR;
6. MAC control element for Sidelink BSR, with exception of Sidelink BSR included for padding;
7. Data from any Logical Channel, except data from UL-CCCH ("except data from UL-CCCH" can mean UL-DCCH);
8. MAC control element for BSR included for padding; and
9. MAC control element for Sidelink BSR included for padding.

In the above example, the UL-DCCH message requesting SI can be placed higher than most other MAC CEs. This is just an example and other variations are possible. For example, though only a UL-DCCH message requesting SI is mentioned above, embodiments can also be used for any other important RRC messages.

According to another possible embodiment a MAC CE itself, rather than a dedicated RRC message, can be used to request SI. According to this embodiment, a MAC CE with a specific logical channel identity can be used. Furthermore, the MAC CE can contain a BITMAP for requesting the SIBs. The length of the BITMAP can be at least long enough to request the SIBs that are not provided by default by the network, such as by excluding the essential SIBs. For example, if there are 30 SIBs in a 5G network and five of these 30 SIBs are provided by default as specified as essential SIBs, etc. then the length of the BITMAP can be sufficient to cover the remaining SIBs. Each bit of the BITMAP can correspond to one SIB or SI-message based on scheduling information. In addition, the BITMAP may either have bits at the end that are not used for a specific version of specification, but may be used in later versions when new SIBs are to be introduced. Also, one bit can be reserved for extendibility purposes. For example, when this bit is set to true, then subsequent requests for new SIBs can be included, such as by using an additional BITMAP of appropriate size. This particular MAC CE for requesting SI can be allowed to trigger a RACH procedure, whereas previous LTE MAC CEs are not allowed to trigger a RACH procedure for requesting UL grant.

According to another possible embodiment, Ultra-Reliable and Low-Latency Communications (URLLC) data are small data packets with end to end latencies shorter than 1 ms. Based on the LTE logical channel prioritization procedure, a URLLC data can be de-prioritized compared with many MAC CEs, such as described in section 5.4.3.1 of TS 36321-e10. This may in some cases result in the desired URLLC data latency not being met. The priority for the Logical Channel Prioritization procedure can be altered such that the URLLC data or data from similar latency critical application is higher in priority than some of the MAC CEs. This can facilitate URLLC data latency being met. For example, in order of priority with "1" being the highest priority:

1. MAC control element for C-RNTI or data from UL-CCCH;
2. URLLC (or similar) application data;
3. UL-DCCH message requesting System Information;
4. MAC control element for SPS confirmation;
5. MAC control element for BSR, with exception of BSR included for padding;
6. MAC control element for PHR, Extended PHR, or Dual Connectivity PHR;
7. MAC control element for Sidelink BSR, with exception of Sidelink BSR included for padding;
8. data from any Logical Channel, except data from UL-CCCH;
9. MAC control element for BSR included for padding; and
10. MAC control element for Sidelink BSR included for padding.

In the above example, URLLC (or similar) application data can be placed higher than most other MAC CEs. This is just an example and other variations are possible. According to a possible implementation, the network can to configure whether URLLC (or similar) application data and/or UL-DCCH message requesting SI take higher priority compared to some MAC CEs or not.

Figure 3:
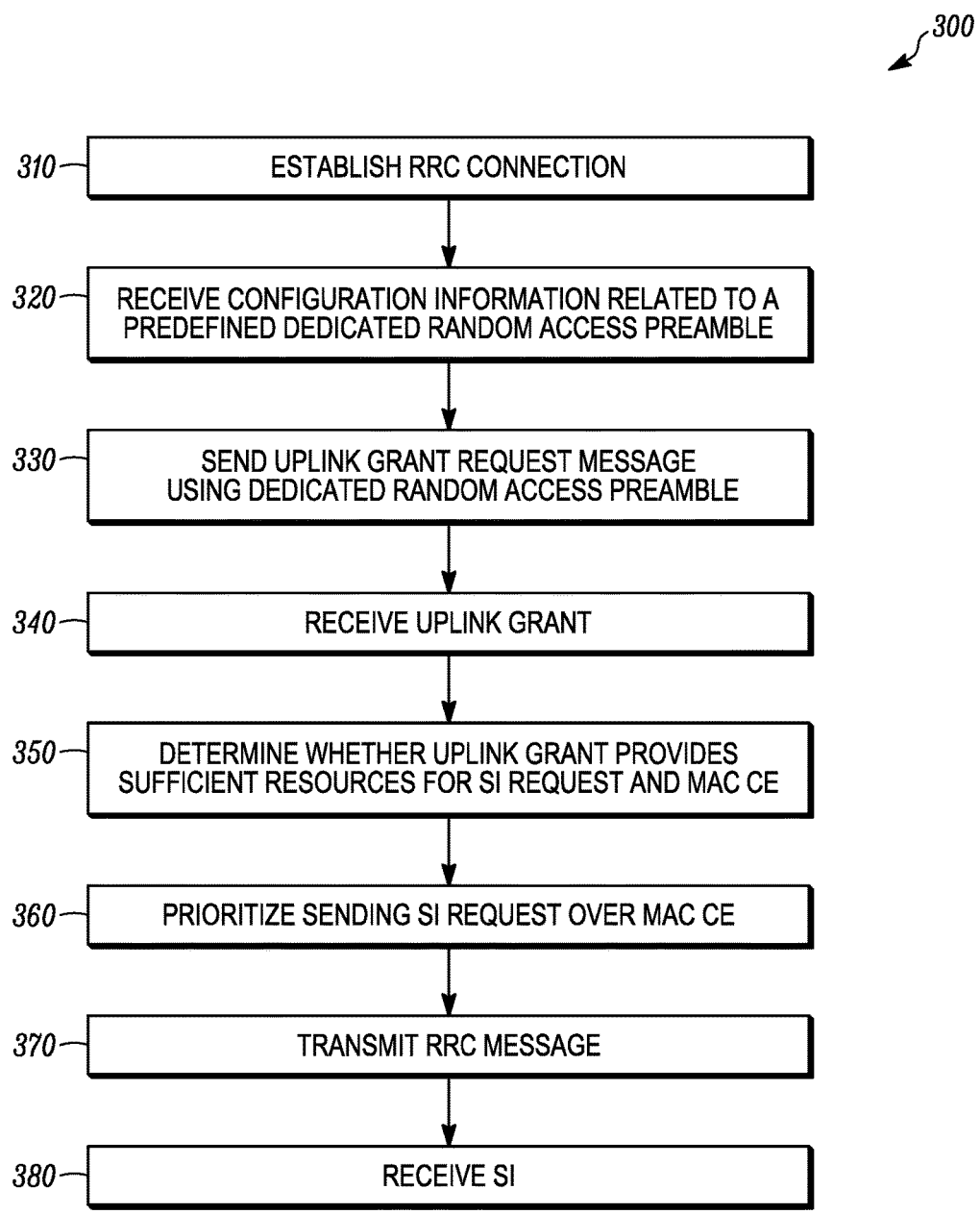
FIG. 3 is an example flowchart illustrating the operation of a wireless communication device according to a possible embodiment.

FIG. 3 is an example flowchart 300 illustrating the operation of a wireless communication device, such as the UE 110, according to a possible embodiment. At 310, a radio resource control connection can be established with a wireless wide area network base station to enter a radio resource control connected state.

At 320, configuration information related to a predefined dedicated random access channel preamble can be received from the base station. The configuration information related to the predefined dedicated random access channel preamble can be received before or after establishing the radio resource control connection. The configuration information related to the predefined dedicated random access channel preamble can be received from the base station in an essential system information block. The essential system information block can include essential system information associated with a cell of the base station. The configuration information related to the predefined dedicated random access channel preamble can also be received from the base station in a dedicated radio resource control message. The configuration information related to the predefined dedicated random access channel preamble can further be received from the base station in a handover command message. Alternately, the configuration information related to the predefined dedicated random access channel preamble can be predefined in the specification, can be preset in the UE, or can be otherwise obtained by the UE.

At 330, an uplink grant request message can be sent using a predefined dedicated random access channel preamble while in the radio resource control connected state. The predefined dedicated random access preamble can be based on the configuration information related to the predefined dedicated random access preamble. The uplink grant request message can request resources to at least accommodate a system information request. At 340, an uplink grant can be received from the base station. The received uplink grant can correspond to the uplink grant request.

At 350, a determination may be made as to whether the uplink grant provides resources to accommodate both a system information request and a medium access control control element. For example, a medium access control control element can include a buffer status report. At 360, sending the system information request can be prioritized over sending the medium access control control element when the uplink grant does not provide resources to accommodate both the system information request and the medium access control control element.

At 370, a radio resource control message can be transmitted in response to receiving the uplink grant. The radio resource control message can include a system information request in response to receiving the uplink grant. At 380, a system information block can be received in response to sending the radio resource control message.

Figure 4:
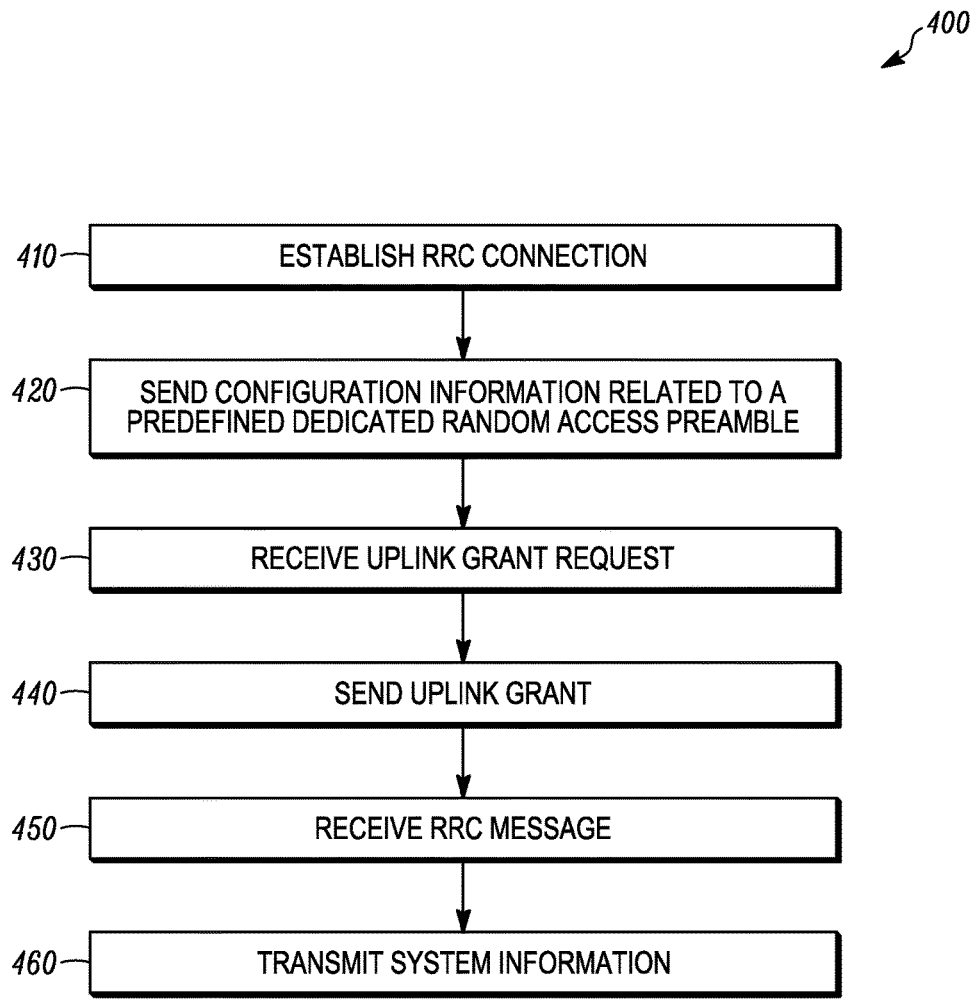
FIG. 4 is an example flowchart illustrating the operation of wireless communication device according to a possible embodiment.

FIG. 4 is an example flowchart 400 illustrating the operation of wireless communication device, such as the base station 120, according to a possible embodiment. At 410, a radio resource control connection can be established with a user equipment.

At 420, configuration information related to a predefined dedicated random access channel preamble can be sent to the user equipment. The configuration information related to the predefined dedicated random access channel preamble can be sent before or after establishing the radio resource control connection. The configuration information related to the predefined dedicated random access channel preamble can be sent to the user equipment in an essential system information block. The essential system information block can include essential system information associated with a cell of the base station. The configuration information related to the predefined dedicated random access channel preamble can also be sent to the user equipment in a dedicated radio resource control message. The configuration information related to the predefined dedicated random access channel preamble can additionally be sent to the user equipment in a handover command message.

At 430, an uplink grant request message having a predefined dedicated random access channel preamble can be received while having the resource control connection with the user equipment. The predefined dedicated random access channel preamble can be based on the configuration information related to the predefined dedicated random access channel preamble. At 440, an uplink grant can be sent to the user equipment in response to receiving the uplink grant request message having a predefined dedicated random access channel preamble. The uplink grant can grant resources to at least accommodate a system information request sent by the user equipment.

At 450, a radio resource control message corresponding to the uplink grant can be received. The radio resource control message can include a system information request from the user equipment. At 460, system information can be transmitted in a system information bock to the user equipment in response to receiving the radio resource control message.

Figure 5:
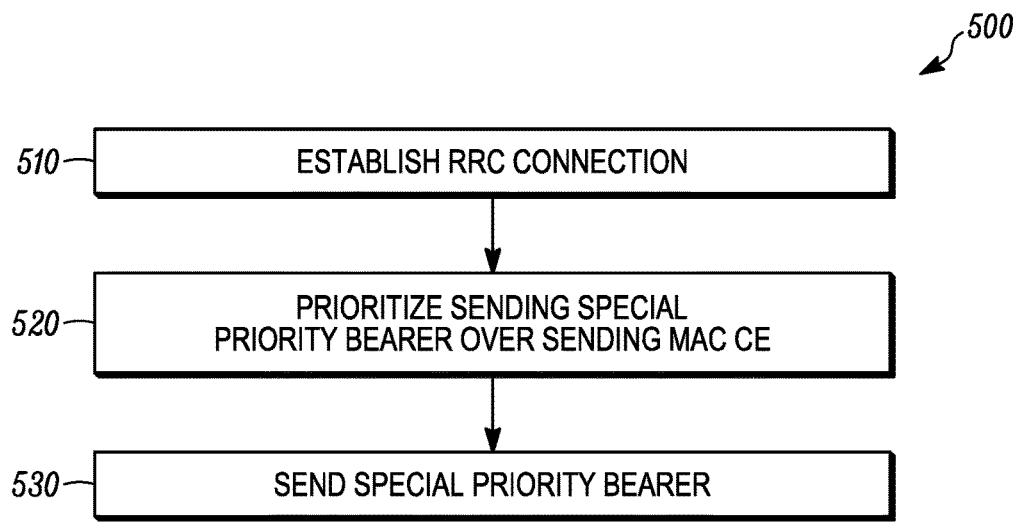
FIG. 5 is an example flowchart illustrating the operation of a wireless communication device according to a possible embodiment.

FIG. 5 is an example flowchart 500 illustrating the operation of a wireless communication device, such as the UE 110, according to a possible embodiment. At 510, a radio resource control connection can be established with a wireless wide area network base station to enter a radio resource control connected state.

At 520, sending a special priority bearer other than a medium access control control element can be prioritized over sending a medium access control control element, also referred to as a MAC CE, used for power headroom reporting. The special priority bearer can be an uplink-dedicated control channel message requesting system information. The special priority bearer can also be ultra-reliable and low-latency communications. The special priority bearer can also be application data. The special priority bearer can also be a radio bearer configured by the wireless wide area network. A medium access control control element for power headroom reporting can include a medium access control control element for power headroom reporting, a medium access control control element for extended power headroom reporting, a medium access control control element for dual connectivity power headroom reporting, and/or any other a medium access control control element for power headroom reporting. Prioritizing can also include prioritizing sending the special priority bearer over sending a medium access control control element for a buffer status report. Prioritizing can also include prioritizing sending the special priority bearer over sending a medium access control control element for semi-persistent scheduling.

Prioritizing can also include prioritizing, in a logical channel prioritization procedure, sending a special priority bearer other than a medium access control control element over sending a medium access control control element used for power headroom reporting and/or over other medium access control elements. A logical channel prioritization procedure can manage the sharing of uplink resources between radio bearers, where radio bearers can be prioritized in a descending order for transmission using uplink resources. The logical channel prioritization procedure can be defined in TS 36.321. For example, using logical channel prioritization, when a UE receives an UL grant, it can determine what information will be part of a MAC Transport Block (TB) that will be sent using the UL grant. The logical channel prioritization procedure can prioritize certain MAC CE's over other information. Some embodiments can alter the prioritization in logical channel prioritization such that sending an uplink-dedicated control channel message requesting SI can be prioritized over some or all MAC CEs.

According to a possible embodiment, the network can configure a radio bearer and also designate/configure this bearer as Special Priority Bearer, also referred to as an SPB. If a bearer is configured as an SPB bearer, then it can take priority over certain MAC CEs, such as MAC CEs for Power Headroom Reports (PHR), MAC CEs for Buffer Status Reports (BSR), MAC CEs for Semi-Persistent Scheduling (SPS) and other MAC CEs. In addition, the network can explicitly configure a particular SPB to take priority over a selected MAC CE in a priority order list defined in section 5.4.3.1 of 3GPP TS 36321-e10. A radio bearer in this regard can be a Signaling Radio Bearer (SRB) or a Data Radio Bearer (DRB). Thus, the network can configure each established bearer, whether SRB or DRB, by using, for example, a one bit Boolean flag for a SPB. Examples radio bearers can include a SRB carrying a SI-request, a DRB carrying a low-latency data bearer, such as from URLLC application, and/or other useful radio bearers. At 530, the special priority bearer can be sent while in the radio resource control connected state.

Figure 6:
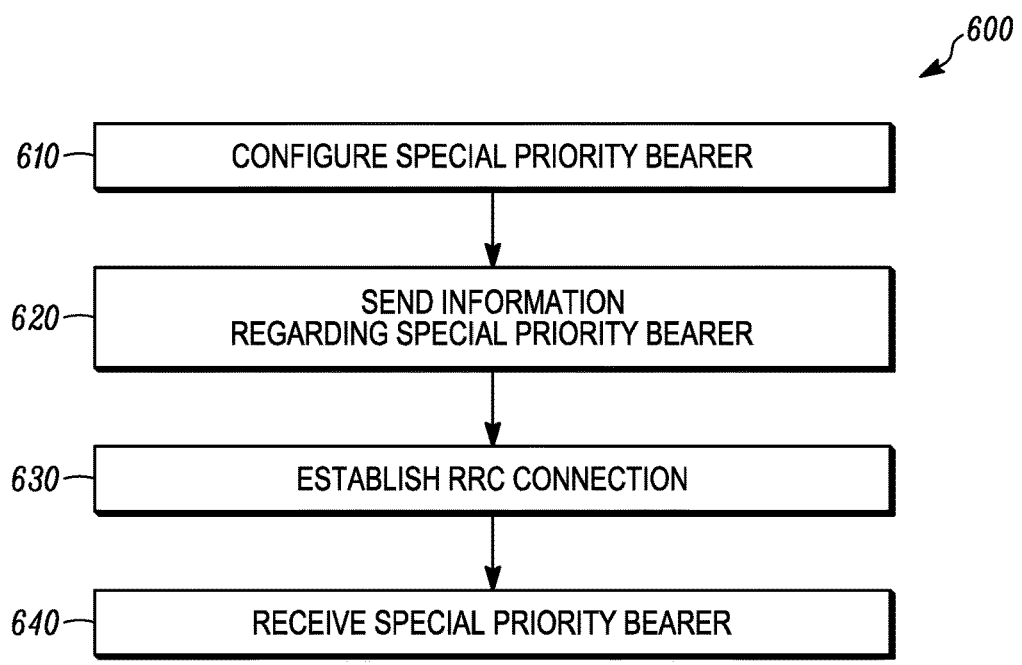
FIG. 6 is an example flowchart illustrating the operation of wireless communication device according to a possible embodiment.

FIG. 6 is an example flowchart 600 illustrating the operation of wireless communication device, such as the base station 120, according to a possible embodiment. At 610, a special priority bearer other than a medium access control control element can be configured to take priority over a medium access control control element used for power headroom reporting. The special priority bearer can also be prioritized over a medium access control control element for a buffer status report. The special priority bearer can be prioritized over a medium access control control element for semi-persistent scheduling. The priority bearer can be prioritized in a logical channel prioritization procedure over a medium access control control element used for power headroom reporting and/or over other medium access control elements. The special priority bearer can be an uplink-dedicated control channel message requesting system information. The special priority bearer can also be ultra-reliable and low-latency communications. The special priority bearer can also be application data. The special priority bearer can also be a radio bearer configured by a wireless wide area network.

At 620, information regarding the special priority bearer can be sent to a user equipment. The information regarding the special priority bearer can be sent to the user equipment before or after establishing a radio resource control connection. At 630, a radio resource control connection can be established with the user equipment. At 640, the special priority bearer can be received while having the resource control connection with the user equipment.

Figure 7:
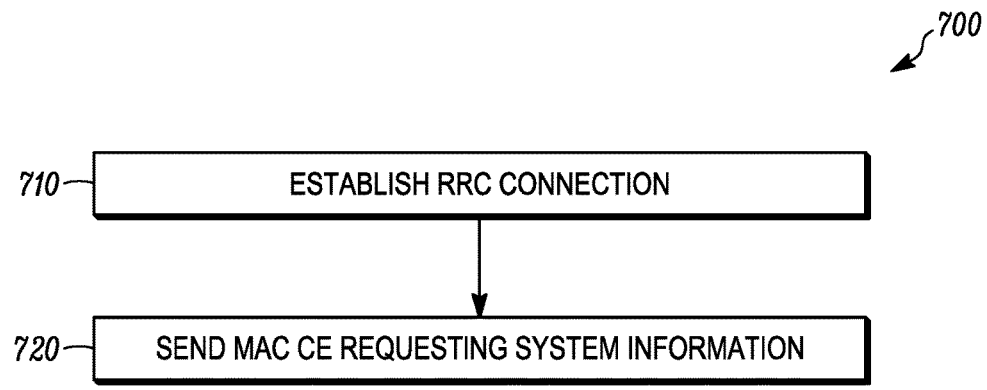
FIG. 7 is an example flowchart illustrating the operation of a wireless communication device according to a possible embodiment.

FIG. 7 is an example flowchart 700 illustrating the operation of a wireless communication device, such as the UE 110, according to a possible embodiment. At 710, a radio resource control connection can be established with a wireless wide area network base station to enter a radio resource control connected state.

At 720, a medium access control control element requesting system information can be sent while in the radio resource control connected state. A particular MAC CE can be identified by a MAC Protocol Data Unit (PDU) subheader with a corresponding Logical Channel Identifier (LCID) for the particular MAC CE as specified in table 6.2.1-1 of 3GPP TS36321-e10. Each CE can have a fixed size and can include a single field or multiple fields defined for that CE. The medium access control control element requesting system information can provide for a random access channel procedure for requesting an uplink grant.

The medium access control control element can contain a bitmap for requesting system information blocks for the system information. A length of the bitmap can be at least long enough to request remaining system information blocks in a wireless wide area network beyond default system information blocks provided by the wireless wide area network. For example, according to a possible embodiment, if there are 30 SIBs in a 5th Generation network and five of these 30 SIBs are provided by default, are specified as essential, and/or otherwise reserved, provided, and/or specified, then the length of the bitmap can be just sufficient to cover the remaining SIBs. Each bit of the bitmap can correspond to one system information block. Each bit of the bitmap can also correspond to a system information message based on scheduling information and/or a system information block. For an example of a SI message based on scheduling information, an SI message can be a combination of SIBs with a periodicity. The network can send a SI and the SI can contain one or more SIBs. The UE can know which SIB(s) is/are contained in each SI message.

The bitmap can include extra bits reserved for information that is not currently available at the time of sending the medium access control control element. For example, the bitmap can include extra bits reserved for system information blocks that are not currently available at the time of sending the medium access control control element. The bitmap can also include a bit that indicates an additional bitmap is available for additional system information blocks.

Figure 8:
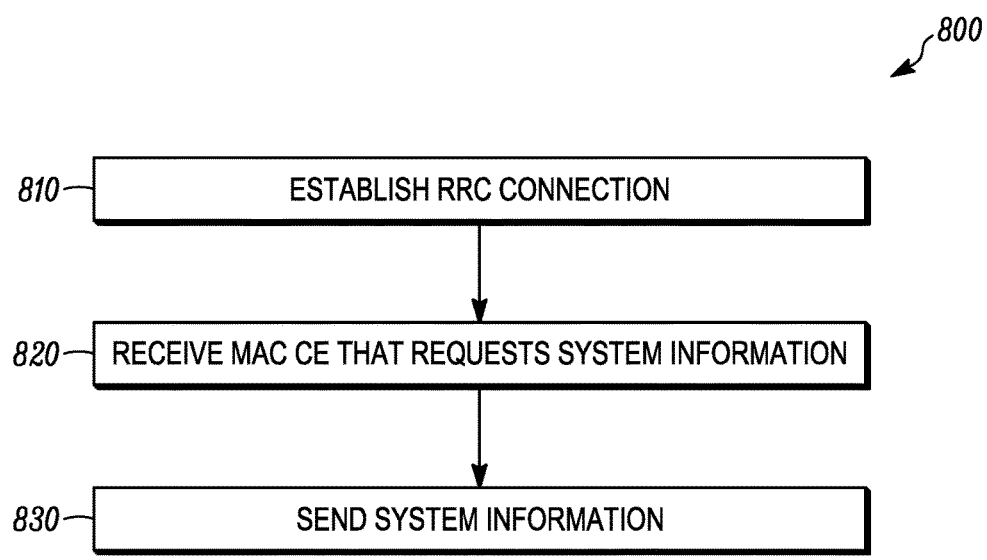
FIG. 8 is an example flowchart illustrating the operation of wireless communication device according to a possible embodiment.

FIG. 8 is an example flowchart 800 illustrating the operation of wireless communication device, such as the base station 120, according to a possible embodiment. At 810, a radio resource control connection can be established with a user equipment.

At 820, a medium access control control element can be received from the user equipment while the base station has a radio resource control connection established with the user equipment. The medium access control control element can request system information. The medium access control control element requesting system information can provide for a random access channel procedure for requesting an uplink grant.

The medium access control control element can contain a bitmap for requesting system information blocks for the system information. A length of the bitmap can be at least long enough to request remaining system information blocks in a wireless wide area network beyond default system information blocks provided by the wireless wide area network. Each bit of the bitmap can correspond to one system information block. Each bit of the bitmap can also correspond to a system information message based on scheduling information and/or a system information block. The bitmap can include extra bits reserved for information that is not currently available at the time of sending the medium access control control element. The bitmap can also include extra bits reserved for system information blocks that are not currently available at the time of sending the medium access control control element. The bitmap can further include a bit that indicates an additional bitmap is available for additional system information blocks. At 830, the system information can be sent to the user equipment in response to receiving the medium access control control element.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
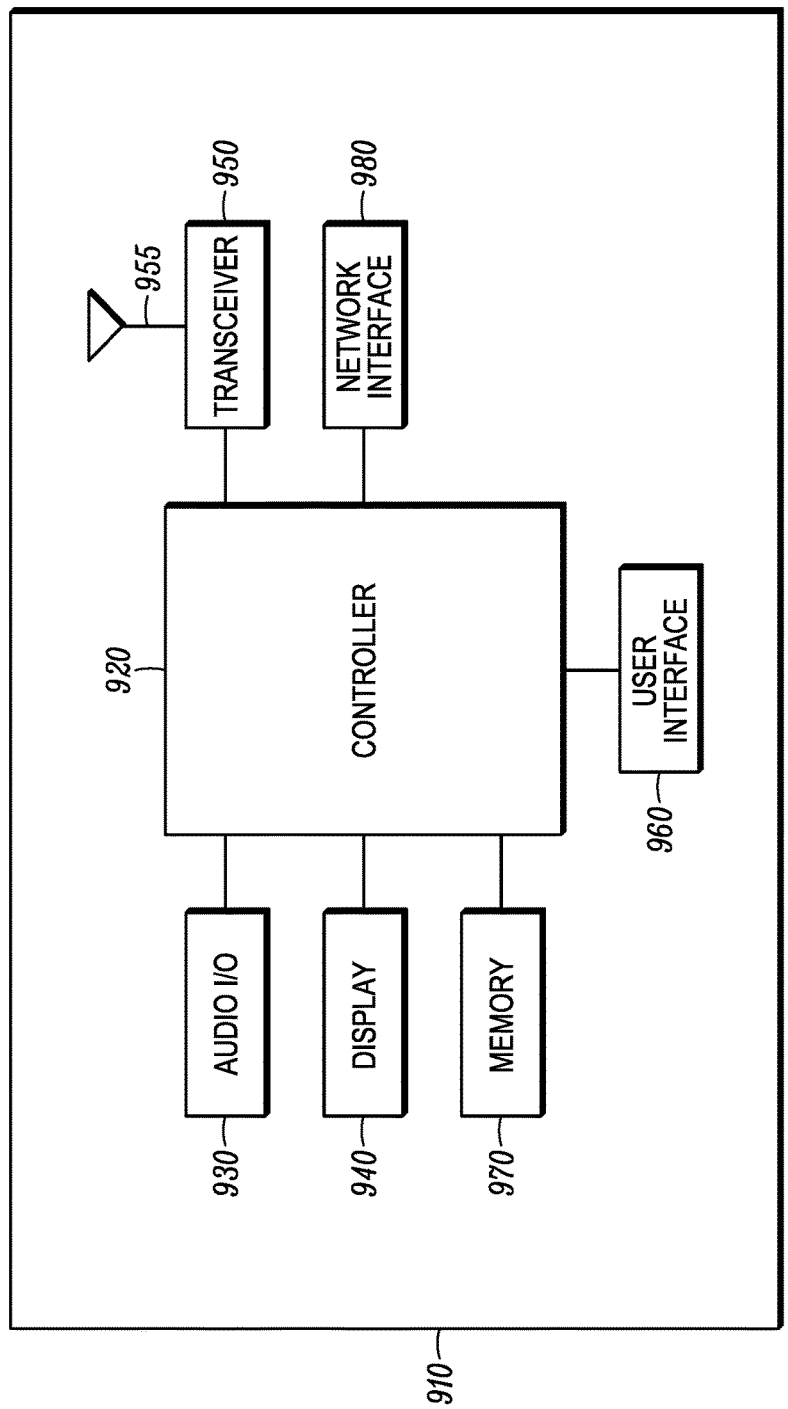
FIG. 9 is an example block diagram of an apparatus according to a possible embodiment.

FIG. 9 is an example block diagram of an apparatus 900, such as the UE 110, the base station 120, or any other wireless communication device, according to a possible embodiment. The apparatus 900 can include a housing 910, a controller 920 coupled to the housing 910, audio input and output circuitry 930 coupled to the controller 920, a display 940 coupled to the controller 920, a transceiver 950 coupled to the controller 920, an antenna 955 coupled to the transceiver 950, a user interface 960 coupled to the controller 920, a memory 970 coupled to the controller 920, and a network interface 980 coupled to the controller 920. The apparatus 900 can perform the methods described in all the embodiments.

The display 940 can be a viewfinder, a liquid crystal display (LCD), a light emitting diode (LED) display, a plasma display, a projection display, a touch screen, or any other device that displays information. The transceiver 950 can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 970 can include a random access memory, a read only memory, an optical memory, a solid state memory, a flash memory, a removable memory, a hard drive, a cache, or any other memory that can be coupled to an apparatus.

The apparatus 900 or the controller 920 may implement any operating system, such as Microsoft Windows®, UNIX®, or LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 970 or elsewhere on the apparatus 900. The apparatus 900 or the controller 920 may also use hardware to implement disclosed operations. For example, the controller 920 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments. Some or all of the additional elements of the apparatus 900 can also perform some or all of the operations of the disclosed embodiments.

In operation as a UE, such as the UE 110, according to a possible embodiment the transceiver 950 can establish a radio resource control connection with a wireless wide area network base station to enter a radio resource control connected state. The transceiver can receive configuration information related to a predefined dedicated random access channel preamble from the base station. The transceiver can receive the configuration information related to the predefined dedicated random access channel preamble from the base station in an essential system information block. The essential system information block can include essential system information associated with a cell of the base station. The transceiver can also receive the configuration information related to the predefined dedicated random access channel preamble from the base station in a dedicated radio resource control message. The transceiver can additionally receive the configuration information related to the predefined dedicated random access channel preamble from the base station in a handover command message.

The transceiver 950 can send an uplink grant request message using a predefined dedicated random access channel preamble while in the radio resource control connected state. The predefined dedicated random access channel preamble can be based on the configuration information related to the predefined dedicated random access channel preamble. The uplink grant request message can request resources to at least accommodate a system information request. The transceiver 950 can receive an uplink grant from the base station.

The controller 920 can determine whether the uplink grant provides resources to accommodate both the system information request and a medium access control control element. For example, the medium access control control element can include a buffer status report. The controller 920 can prioritize sending a system information request over sending the medium access control control element when the uplink grant does not provide resources to accommodate both the system information request and the medium access control control element.

The transceiver 950 can transmit a radio resource control message in response to receiving the uplink grant. The radio resource control message can include a system information request in response to receiving the uplink grant. The transceiver 950 can receive a system information block in response to sending the radio resource control message.

In operation as a base station, such as the base station 120, according to a possible embodiment, the controller 920 can establish a radio resource control connection with a user equipment. The transceiver 950 can send configuration information related to a predefined dedicated random access channel preamble to the user equipment. The transceiver 950 can send the configuration information related to the predefined dedicated random access channel preamble to the user equipment in an essential system information block, the essential system information block including essential system information associated with a cell of the base station. The transceiver 950 can also send the configuration information related to the predefined dedicated random access channel preamble to the user equipment in a dedicated radio resource control message. The transceiver can additionally send the configuration information related to the predefined dedicated random access channel preamble to the user equipment in a handover command message.

The transceiver 950 can receive an uplink grant request message having the predefined dedicated random access channel preamble while having the resource control connection with the user equipment. The controller 920 can process the uplink grant request message and generate the uplink grant in response to receiving the uplink grant request message. The transceiver 950 can send an uplink grant to the user equipment in response to receiving the uplink grant request message having a predefined dedicated random access channel preamble. The uplink grant can grant resources to at least accommodate a system information request sent by the user equipment. The transceiver 950 can receive a radio resource control message corresponding to the uplink grant. The radio resource control message can include a system information request from the user equipment. The transceiver 950 can transmit system information in a system information bock to the user equipment in response to receiving the radio resource control message.

In operation as a UE, such as the UE 110, according to a possible embodiment the controller 920 can establish a radio resource control connection with a wireless wide area network base station to enter a radio resource control connected state. The controller 920 can prioritize sending a special priority bearer other than a medium access control control element over sending a medium access control control element used for power headroom reporting. The controller 920 can also prioritize sending the special priority bearer over sending a medium access control control element for a buffer status report. The controller 920 can also prioritize sending the special priority bearer over sending a medium access control control element for semi-persistent scheduling. The controller 920 can also prioritize, in a logical channel prioritization procedure, sending a special priority bearer other than a medium access control control element over sending certain medium access control control elements.

The transceiver 950 can send the special priority bearer while in the radio resource control connected state. The special priority bearer can be an uplink-dedicated control channel message requesting system information. The special priority bearer can also be ultra-reliable and low-latency communications. The special priority bearer can also be application data. The special priority bearer can also be a radio bearer configured by the wireless wide area network.

In operation as a base station, such as the base station 120, according to a possible embodiment, the controller 920 can configure a special priority bearer other than a medium access control control element to take priority over a medium access control control element used for power headroom reporting. The special priority bearer can also be prioritized over a medium access control control element for a buffer status report. The special priority bearer can also be prioritized over a medium access control control element for semi-persistent scheduling. The special priority bearer can be prioritized in a logical channel prioritization procedure over a medium access control control element used for power headroom reporting and/or over other medium access control control elements. The special priority bearer can be an uplink-dedicated control channel message requesting system information. The special priority bearer can also be ultra-reliable and low-latency communications. The special priority bearer can also be application data. The special priority bearer can also be a radio bearer configured by the wireless wide area network. The transceiver 950 can send information regarding the special priority bearer to a user equipment. The controller 920 can establish a radio resource control connection with the user equipment. The transceiver 950 can receive the special priority bearer while having the resource control connection with the user equipment.

In operation as a UE, such as the UE 110, according to a possible embodiment the controller 920 can establish a radio resource control connection with a wireless wide area network base station to enter a radio resource control connected state. The transceiver 950 can send a medium access control control element requesting system information while in the radio resource control connected state. The medium access control control element requesting system information can provide for a random access channel procedure for requesting an uplink grant. The medium access control control element can contain a bitmap for requesting system information blocks for the system information. A length of the bitmap can be at least long enough to request remaining system information blocks in a wireless wide area network beyond default system information blocks provided by the wireless wide area network. Each bit of the bitmap can correspond to one system information block. Each bit of the bitmap can also correspond to at least one selected from a system information message based on scheduling information and a system information block. The bitmap can include extra bits reserved for information that is not currently available at the time of sending the medium access control control element. The bitmap can also include extra bits reserved for system information blocks that are not currently available at the time of sending the medium access control control element. The bitmap can also include a bit that indicates an additional bitmap is available for additional system information blocks.

In operation as a base station, such as the base station 120, according to a possible embodiment, the controller 920 can establish a radio resource control connection with a user equipment. The transceiver 950 can receive a medium access control control element from the user equipment while the base station has a radio resource control connection established with the user equipment. The medium access control control element can request system information. The medium access control control element requesting system information can provide for a random access channel procedure for requesting an uplink grant. The medium access control control element can contain a bitmap for requesting system information blocks for the system information. A length of the bitmap can be at least long enough to request remaining system information blocks in a wireless wide area network beyond default system information blocks provided by the wireless wide area network. Each bit of the bitmap can correspond to one system information block. Each bit of the bitmap can also correspond to at least one selected from a system information message based on scheduling information and a system information block. The bitmap can include extra bits reserved for information that is not currently available at the time of sending the medium access control control element. The bitmap can also include extra bits reserved for system information blocks that are not currently available at the time of sending the medium access control control element. The bitmap can further include a bit that indicates an additional bitmap is available for additional system information blocks. The transceiver 950 can send the system information to the user equipment in response to receiving the medium access control control element.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   establishing, by a user equipment, a radio resource control connection with a wireless wide area network base station to enter a radio resource control connected state; and
   sending, by the user equipment, a medium access control control element requesting system information while in the radio resource control connected state,
   wherein the medium access control control element contains a bitmap for requesting system information blocks for the system information.

2. The method according to claim 1, wherein the medium access control control element requesting system information provides for a random access channel procedure for requesting an uplink grant.

3. The method according to claim 1, wherein a length of the bitmap is at least long enough to request remaining system information blocks in a wireless wide area network beyond default system information blocks provided by the wireless wide area network.

4. The method according to claim 1, wherein each bit of the bitmap corresponds to one system information block.

5. The method according to claim 4, wherein each bit of the bitmap corresponds to at least one selected from a system information message based on scheduling information and a system information block.

6. The method according to claim 1, wherein the bitmap includes extra bits reserved for information that is not currently available at the time of sending the medium access control control element.

7. The method according to claim 6, wherein the bitmap includes extra bits reserved for system information blocks that are not currently available at the time of sending the medium access control control element.

8. The method according to claim 1, wherein the bitmap includes a bit that indicates an additional bitmap is available for additional system information blocks.

9. An apparatus comprising:
- a controller that controls operations of the apparatus, where the controller establishes a radio resource control connection with a wireless wide area network base station to enter a radio resource control connected state; and
- a transceiver coupled to the controller, where the transceiver sends a medium access control control element requesting system information while in the radio resource control connected state,
- wherein the medium access control control element contains a bitmap for requesting system information blocks for the system information.

10. The apparatus according to claim 9, wherein the medium access control control element requesting system information provides for a random access channel procedure for requesting an uplink grant.

11. The apparatus according to claim 9, wherein a length of the bitmap is at least long enough to request remaining system information blocks in a wireless wide area network beyond default system information blocks provided by the wireless wide area network.

12. The apparatus according to claim 9, wherein each bit of the bitmap corresponds to one system information block.

13. The apparatus according to claim 12, wherein each bit of the bitmap corresponds to at least one selected from a system information message based on scheduling information and a system information block.

14. The apparatus according to claim 9, wherein the bitmap includes extra bits reserved for information that is not currently available at the time of sending the medium access control control element.

15. The apparatus according to claim 14, wherein the bitmap includes extra bits reserved for system information blocks that are not currently available at the time of sending the medium access control control element.

16. The apparatus according to claim 9, wherein the bitmap includes a bit that indicates an additional bitmap is available for additional system information blocks.

17. The apparatus according to claim 9, wherein the apparatus comprises a smartphone.

18. A method comprising:
- establishing, by a user equipment, a radio resource control connection with a wireless wide area network base station to enter a radio resource control connected state; and
- sending, by the user equipment, a medium access control control element requesting system information while in the radio resource control connected state,
- wherein the medium access control control element provides for a random access channel procedure for requesting an uplink grant, and
- wherein the medium access control control element contains a bitmap for requesting system information blocks for the system information.

* * * * *